US009977878B2

(12) United States Patent
Hough et al.

(10) Patent No.: US 9,977,878 B2
(45) Date of Patent: May 22, 2018

(54) METHODS AND SYSTEMS FOR ACCESSING LICENSABLE ITEMS IN A GEOGRAPHIC AREA

(71) Applicant: QUALCOMM Incorporated, San Diego, CA (US)

(72) Inventors: Jason M. Hough, San Diego, CA (US); Kameron N. Kerger, San Diego, CA (US); Jonathan K. Kies, Encinitas, CA (US); Giridhar D. Mandyam, San Diego, CA (US); Brian D. Vogelsang, La Mesa, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 14/918,607

(22) Filed: Oct. 21, 2015

(65) Prior Publication Data

US 2016/0042482 A1    Feb. 11, 2016

Related U.S. Application Data

(62) Division of application No. 13/282,452, filed on Oct. 26, 2011, now Pat. No. 9,262,595.

(Continued)

(51) Int. Cl.
*G06F 15/16* (2006.01)
*G06F 21/10* (2013.01)
(Continued)

(52) U.S. Cl.
CPC .......... *G06F 21/10* (2013.01); *G06Q 50/184* (2013.01); *H04L 67/1076* (2013.01);
(Continued)

(58) Field of Classification Search
CPC .......... G06F 21/10; H04N 21/2541; H04N 21/4627; H04N 21/8355; G06Q 50/184; H04W 4/021; H04W 4/14; H04L 67/1076
(Continued)

(56) References Cited

U.S. PATENT DOCUMENTS 7,076,652 B2 * 7/2006 Ginter ............... G06F 21/10
348/E5.006
7,496,540 B2 * 2/2009 Irwin ............... G06F 21/10
705/50

(Continued)

FOREIGN PATENT DOCUMENTS

CN    101223514 A    7/2008
EP    1530342 A2    5/2005
(Continued)

OTHER PUBLICATIONS

International Search Report and Written Opinion—PCT/US2011/058131—ISA/EPO—dated Mar. 5, 2012.
(Continued)

*Primary Examiner* — Zarni Maung
(74) *Attorney, Agent, or Firm* — Muncy, Geissler, Olds & Lowe, P.C.

(57) ABSTRACT

Methods and apparatus for accessing licensable items unique to a geographic area via a wireless device are provided. The method and apparatus may include obtaining access to licensable items available in a first location of the wireless device. The methods and apparatus may further include downloading a licensable item. The licensable item is associated with a license providing the wireless device with a right to distribute the licensable item. The methods and apparatus may also include leaving a virtual copy of the licensable item in a second location of the wireless device different from the first location using the right to distribute.

26 Claims, 10 Drawing Sheets

Related U.S. Application Data

(60) Provisional application No. 61/408,397, filed on Oct. 29, 2010.

(51) Int. Cl.
*H04N 21/8355* (2011.01)
*H04N 21/4627* (2011.01)
*H04N 21/254* (2011.01)
*G06Q 50/18* (2012.01)
*H04L 29/08* (2006.01)
*H04W 4/02* (2018.01)
*H04W 4/14* (2009.01)
*G06F 12/00* (2006.01)

(52) U.S. Cl.
CPC ..... *H04N 21/2541* (2013.01); *H04N 21/4627* (2013.01); *H04N 21/8355* (2013.01); *H04W 4/021* (2013.01); *H04W 4/14* (2013.01)

(58) Field of Classification Search
USPC .......... 709/225; 705/30, 52, 57, 59
See application file for complete search history.

(56) References Cited

U.S. PATENT DOCUMENTS

| | | | |
|---|---|---|---|
| 7,676,219 B2 | 3/2010 | Williams et al. | |
| 8,095,468 B2* | 1/2012 | Szucs | G06F 21/10 380/201 |
| 8,392,333 B2* | 3/2013 | Szucs | G06F 21/10 380/201 |
| 9,262,595 B2 | 2/2016 | Hough et al. | |
| 2002/0016775 A1* | 2/2002 | Nakagawa | G06F 21/10 705/52 |
| 2003/0078875 A1* | 4/2003 | Moore | G06F 21/10 705/37 |
| 2005/0044016 A1* | 2/2005 | Irwin | G06F 21/10 705/30 |
| 2007/0283420 A1 | 12/2007 | Rantalahti | |
| 2008/0097919 A1* | 4/2008 | Szucs | G06F 21/10 705/52 |
| 2008/0109360 A1 | 5/2008 | Hill et al. | |
| 2008/0318547 A1* | 12/2008 | Ballou, Jr. | H04L 63/0838 455/410 |
| 2009/0183264 A1* | 7/2009 | Chmaytelli | H04L 63/10 726/28 |
| 2011/0107239 A1* | 5/2011 | Adoni | A63F 13/12 715/757 |
| 2012/0078797 A1* | 3/2012 | Szucs | G06F 21/10 705/57 |
| 2012/0136998 A1 | 5/2012 | Hough et al. | |

FOREIGN PATENT DOCUMENTS

| | | |
|---|---|---|
| JP | 2004342031 A | 12/2004 |
| JP | 2006101157 A | 4/2006 |
| JP | 2006101475 A | 4/2006 |
| JP | 2008252692 A | 10/2008 |
| JP | 2008546080 A | 12/2008 |
| JP | 2010009441 A | 1/2010 |
| JP | 2010074272 A | 4/2010 |
| WO | 2008060300 A1 | 5/2008 |
| WO | 2009004699 A1 | 1/2009 |

OTHER PUBLICATIONS

Narzt et al., "Augmented reality navigation systems", Universal Access in the Information Society, vol. 4, Issue 3 (2006), pp. 177-187.

Supplementary European Search Report—EP11779322—Search Authority—The Hague—dated Mar. 7, 2016.

* cited by examiner

METHODS AND SYSTEMS FOR ACCESSING LICENSABLE ITEMS IN A GEOGRAPHIC AREA

CLAIM OF PRIORITY UNDER 35 U.S.C. § 120

The present Application for Patent is a divisional of U.S. patent application Ser. No. 13/282,452, entitled "METHODS AND SYSTEMS FOR ACCESSING LICENSABLE ITEMS IN A GEOGRAPHIC AREA," filed Oct. 26, 2011, which issued as U.S. Pat. No. 9,262,595 on Feb. 16, 2016, and which claims the benefit of U.S. Provisional Application No. 61/408,397, entitled "METHODS AND SYSTEMS FOR ACCESSING CONTENT IN A GEOGRAPHICAL AREA," filed Oct. 29, 2010, assigned to the assignee hereof, and expressly incorporated herein by reference in its entirety.

BACKGROUND

In today's world, wireless communication systems are widely deployed to provide various types of content, including voice, video, music, text, and data, for example. Wireless devices, such as cellular telephones or handheld devices having wireless connection capability are deployed leveraging the wireless communication system by users for communicating and interacting with each other.

Publishers and owners of licensable items, such as digital content or services, may want to create promotions, discounts, or other distribution campaigns to users of wireless devices to promote and generate interest in the licensable items of the publisher. However, the publishers may not want the promotion to apply to all users of a system. Therefore there is a need to license items based on, for example, location. Licensing items based on location could be a powerful promotional tool for owners of licensable items. By limiting the license to a particular area, the publishers may target the promotional campaign to users more likely to use the licensable item. For example, if the publishers created a new sports application, the promotional campaign may be limited to users at a sporting event. Moreover, providing special access to a licensable item based on location may generate an element of fun and exclusivity to the licensable item. In addition, owners of licensable items may want to provide users with the right to distribute the licensable items. Therefore, there is a need in the art to license a licensable item with a right of distribution, and thus, allowing the licensable item to be re-distributed quickly to multiple users across various locations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for accessing licensable items unique to a geographic area via a wireless device. The method may include obtaining access to at least one licensable item available in a first geographic area corresponding to a first location of the wireless device. The method may also include downloading the licensable item. The licensable item is associated with a license providing the wireless device with a right to distribute the licensable item. In addition, the method may include leaving a virtual copy of the licensable item in a second geographic area corresponding to a second location of the wireless device using the right to distribute. The virtual copy of the licensable item is associated with the license. The license further provides another wireless device with a right to access the virtual copy of the licensable item in the second geographic area and to redistribute the virtual copy of the licensable item.

Another aspect relates to at least one processor configured to access licensable items unique to a geographic area via a wireless device. The processor may include a first module for obtaining access to at least one licensable item available in a first geographic area corresponding to a first location of the wireless device. In addition, the processor may include a second module for downloading the licensable item. The licensable item is associated with a license providing the wireless device with a right to distribute the licensable item. The processor may further include a third module for leaving a virtual copy of the licensable item in a second geographic area corresponding to a second location of the wireless device using the right to distribute. The virtual copy of the licensable item is associated with the license. The license further provides another wireless device with a right to access the virtual copy of the licensable item in the second geographic area and to redistribute the virtual copy of the licensable item.

Yet another aspect relates to a computer program product. The computer program product may include a computer-readable medium including at least one instruction for causing a computer to obtain access to at least one licensable item available in a first geographic area corresponding to a first location of the wireless device. The computer-readable medium may also include at least one instruction for causing the computer to download the licensable item. The licensable item is associated with a license providing the wireless device with a right to distribute the licensable item. The computer-readable medium may additionally include at least one instruction for causing the computer to leave a virtual copy of the licensable item in a second geographic area corresponding to a second location of the wireless device using the right to distribute. The virtual copy of the licensable item being associated with the license. The license further provides another wireless device with a right to access the virtual copy of the licensable item in the second geographic area and to redistribute the virtual copy of the licensable item.

Another aspect relates to an apparatus. The apparatus may include means for obtaining access to at least one licensable item available in a first geographic area corresponding to a first location of the wireless device. The apparatus may further include means for downloading the licensable item. The licensable item is associated with a license providing the wireless device with a right to distribute the licensable item. Moreover, the apparatus may include means for leaving a virtual copy of the licensable item in a second geographic area corresponding to a second location of the wireless device using the right to distribute. The virtual copy of the licensable item is associated with the license. The license further provides another wireless device with a right to access the virtual copy of the licensable item in the second geographic area and to redistribute the virtual copy of the licensable item.

Yet another aspect relates to an apparatus for accessing licensable items unique to a geographic area via a wireless device. The apparatus may include a licensable item searching component operable to obtain access to at least one licensable item available in a first geographic area corresponding to a first location of the wireless device. The apparatus may also include a licensable item requesting component operable to download the licensable item, the licensable item being associated with a license providing the wireless device with a right to distribute the licensable item. In addition, the apparatus may include a sharing component operable to leave a virtual copy of the licensable item in a second geographic area corresponding to a second location of the wireless device using the right to distribute, the virtual copy of the licensable item being associated with the license, the license further providing another wireless device with a right to access the virtual copy of the licensable item in the second geographic area and to redistribute the virtual copy of the licensable item.

Another aspect relates to a method for distributing licensable items within a geographic area. The method may include receiving a location for a wireless device within a geographic area. The method may further include notifying the wireless device of an availability of one or more licensable items within the geographic area. In addition, the method may include receiving a request to access at least one of the one or more licensable items. The method may also include determining whether a license is associated with the requested licensable items, and providing access to the requested licensable item based upon the license.

Still another aspect relates to at least one processor configured to distribute licensable items within a geographic area. The processor may include a first module for receiving a location for a wireless device within a geographic area. The processor may also include a second module for notifying the wireless device of an availability of one or more licensable items within the geographic area. The processor may further include a third module for receiving a request to access at least one of the one or more licensable items. Moreover, the processor may include a fourth module for determining whether a license is associated with the requested licensable item and a fifth module for providing access to the requested licensable item based upon the license.

Another aspect relates to a computer program product. The computer program product may include a computer-readable medium including at least one instruction for causing a computer to receive a location for a wireless device within a geographic area. The computer-readable medium may also include at least one instruction for causing the computer to notify the wireless device of an availability of one or more licensable items within the geographic area. In addition, the computer-readable medium may include at least one instruction for causing the computer to receive a request to access at least one of the one or more licensable items. The computer-readable medium may also include at least one instruction for causing the computer to determine whether a license is associated with the requested licensable item, and at least one instruction for causing the computer to provide access to the requested licensable item based upon the license.

Yet another aspect relates to an apparatus. The apparatus may include means for receiving a location for a wireless device within a geographic area. The apparatus may further include means for notifying the wireless device of an availability of one or more licensable items within the geographic area. The apparatus may additionally include means for receiving a request to access at least one of the one or more licensable items. The apparatus may also include means for determining whether a license is associated with the requested licensable item and means for providing access to the requested licensable item based upon the license.

Another aspect relates to an apparatus for distributing licensable items within a geographic area. The apparatus may include a licensable item distribution component operable to receive a location for a wireless device within a geographic area, receive a request to access at least one of the one or more licensable items, determine whether a license is associated with the requested licensable item, and provide access to the requested licensable item based upon the license. The apparatus may further include a notification component operable to send a notification to the wireless device of an availability of one or more licensable items within the geographic area.

Still another aspect relates to a method for accessing licensable items unique to a geographic area via a wireless device. The method may include obtaining access to at least one licensable item available in a first geographic area corresponding to a first location of the wireless device based upon an occurrence of a critical mass requirement. The method may further include downloading the licensable item. The licensable item is associated with a license providing the wireless device with a right to distribute the licensable item. Moreover, the method may include leaving a virtual copy of the licensable item in a second geographic area corresponding to a second location of the wireless device using the right to distribute. The virtual copy of the licensable item is associated with the license. The license further provides another wireless device with a right to access the virtual copy of the licensable item in the second geographic area and to redistribute the virtual copy of the licensable item.

Another aspect relates to at least one processor configured to access licensable items unique to a geographic area via a wireless device. The processor may include a first module for obtaining access to at least one licensable item available in a first geographic area corresponding to a first location of the wireless device based upon an occurrence of a critical mass requirement. The processor may also include a second module for downloading the licensable item. The licensable item is associated with a license providing the wireless device with a right to distribute the licensable item. In addition, the processor may include a third module for leaving a virtual copy of the licensable item in a second geographic area corresponding to a second location of the wireless device using the right to distribute. The virtual copy of the licensable item is associated with the license. The license further provides another wireless device with a right to access the virtual copy of the licensable item in the second geographic area and to redistribute the virtual copy of the licensable item.

Another aspect relates to a computer program product. The computer program product may include a computer-readable medium including at least one instruction for causing a computer to obtain access to at least one licensable item available in a first geographic area corresponding to a first location of the wireless device based upon an occurrence of a critical mass requirement. The computer-readable medium may also include at least one instruction for causing the computer to download the licensable item. The licensable item is associated with a license providing the wireless device with a right to distribute the licensable item. The computer-readable medium may further include at least one instruction for causing the computer to leave a virtual copy of the licensable item in a second geographic area corresponding to a second location of the wireless device using the right to distribute. The virtual copy of the licensable item being associated with the license. The license further provides another wireless device with a right to access the virtual copy of the licensable item in the second geographic area and to redistribute the virtual copy of the licensable item.

Yet another aspect relates to an apparatus. The apparatus may include means for obtaining access to at least one licensable item available in a first geographic area corresponding to a first location of the wireless device based upon an occurrence of a critical mass requirement. The apparatus may also include means for downloading the licensable item. The licensable item is associated with a license providing the wireless device with a right to distribute the licensable item. In addition, the apparatus may include means for leaving a virtual copy of the licensable item in a second geographic area corresponding to a second location of the wireless device using the right to distribute. The virtual copy of the licensable item is associated with the license. The license further provides another wireless device with a right to access the virtual copy of the licensable item in the second geographic area and to redistribute the virtual copy of the licensable item.

Another aspect relates to an apparatus for accessing licensable items unique to a geographic area via a wireless device. The apparatus may include a licensable item searching component operable to obtain access to at least one licensable item available in a first geographic area corresponding to a first location of the wireless device based upon an occurrence of a critical mass requirement. The apparatus may further include a licensable item requesting component operable to download the licensable item. The licensable item is associated with a license providing the wireless device with a right to distribute the licensable item. In addition, the apparatus may include a sharing component operable to leave a virtual copy of the licensable item in a second geographic area corresponding to a second location of the wireless device using the right to distribute. The virtual copy of the licensable item is associated with the license. The license further provides another wireless device with a right to access the virtual copy of the licensable item in the second geographic area and to redistribute the virtual copy of the licensable item.

To the accomplishment of the foregoing and related ends, the one or more aspects comprise the features hereinafter described in detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects relate to methods and systems for using location based licensing to promote and/or encourage the use of licensable items in a particular location. The described methods and systems determine the location of a wireless device and discover and/or determine licensable items that are available in and/or near the location of the wireless device. The licensable items may also include and/or be associated with a license governing the access to and the use of the licensable items. For example, the license may require that the licensable item be used in a particular location and/or during a period of time.

In addition, the described aspects relate to methods and systems for promoting the redistribution of the licensable items. For example, the license associated with the licensable item may allow the user to redistribute the licensable item to a number of users. Thus, the user of a wireless device may have access to licensable items while in a location and may take a virtual copy of the licensable items to a second location and redistribute, e.g., drop, a virtual copy of the licensable item at the second location along with the associated license governing the use of the licensable item. When the user drops a virtual copy of the licensable item at the second location, another user may discover the virtual copy of the licensable item and use the virtual copy of the licensable item based upon the conditions set forth in the license.

As used in this disclosure, the term "licensable item" may relate to "content" or a "content item" or to a "service" or a "service item." As used herein, the term "content" or "content item" includes, at least, one or more of any type of application, multimedia file, image file, executable, program, web page, script, document, presentation, message, data, meta-data, music, video, electronic book, ringtone, wallpaper, an electronic representation of a physical item, or any other type of media or information that may be rendered, processed, or executed on a device.

Also, the term "service" or "service item" includes, at least, providing of an action or an accommodation, including in electronic or non-electronic form. For example, in one aspect, a service may include providing access, such as access to a network server. For instance, in one aspect that should not be construed as limiting, a use case of providing access to a network server may include a scenario where a user is a player in a game, and access is provided to a network server to enable the user to participate in a network-based multi-player service for the game provided by the network server.

Figure 1:
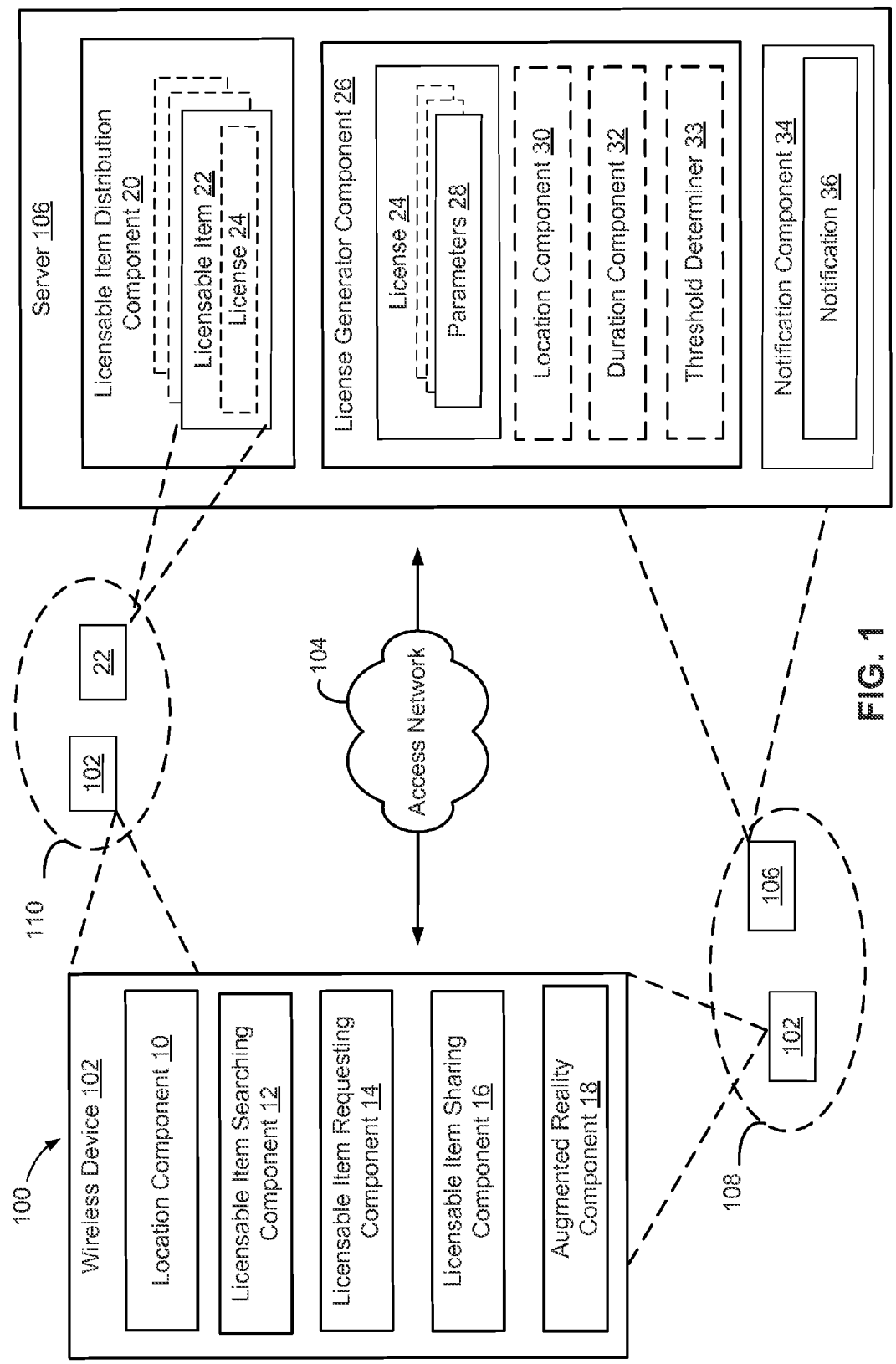
FIG. 1 is an illustration of a connectivity system in accordance with an aspect.

Referring now to FIG. 1, illustrated is an example connectivity system 100 that includes one or more wireless devices 102 communicating through one or more access networks 104 with one or more servers and/or computing devices 106. Wireless device 102 may include any mobile or portable computing or communications device, such as a cellular device, that may connect to an access network 104. Wireless device 102 may be, for example, a cellular telephone, a navigation system, a computing device, a camera, a PDA, a music device, a gaming device, or a handheld device having wireless connection capability, among other devices. Server/computing device 106 may include any mobile or fixed computing device connected to a network. Sever/computing device 106 may include, but is not limited to, a computing device, a server, a cellular telephone, a camera, a PDA, a music device, a gaming device, a navigation system, or a handheld device having wireless connection capability, among other devices. Furthermore, access network 104 may provide one or more types of communication connections, such as any type of wireless airlink, to wireless device 102 and server 106. Wireless device 102 may place and/or receive a communication, e.g., a telephone call, a video conferencing call, an Internet Protocol session, a voice over internet protocol (IP) call, a short message service (SMS) message, a multimedia messaging service (MMS) message, an instant messaging (IM) service message, a chat or net-meeting related connection, a video, music, or data transfer, among other communications, via access network 104 to one or more servers 106. In addition, wireless device 102 may receive a communication via access network 104 from one or more servers 106, or from any other device in communication with access network 104.

Server 106 may include a licensable item distribution component 20 operable for distributing one or more licensable items 22 to one or more wireless devices 102. Licensable item 22 may include but is not limited to, digital content, such as an application (e.g., weather applications, sports applications, news applications, shopping applications, or entertainment applications), games, music, or books, among other content. In addition, licensable item 22 may include or be associated with a license 24. License 24 may include one or more parameters, rules, or requirements that govern the manner in which licensable item 22 may be used and/or redistributed. For example, a license issuer, e.g., a publisher or owner of licensable item 22, may determine that licensable item 22 may only be used within a geographic location. Thus, license 24 may require that the licensable item 22 be used only in the geographic location chosen by the license issuer.

In an aspect, for example, server 106 may include a license generator component 26 to generate license 24 based upon the requirements from the license issuer, e.g., license parameters 28. License parameters 28 may include, but are not limited to, supported locations (e.g., a geographic area where the license may be used); duration of the license (e.g., a time period when the license may be used); quantity threshold (e.g., a number of license to grant before the offer disappears); the license type being offered; behavior when location changes and/or duration expires (e.g., reverting to a demo license, cancel the license, suspend the license, no changes occur); redistribution rights (e.g., if the license can be redistributed, the number of times the license may be redistributed, redistribution location limitations), among other license parameters. License generator component 26 may include a location component 30 operable for determining the locations where license 24 may be used. In an aspect, location component 30 may generate a list, such as a white list of acceptable licensing locations for the given licensable item 22. For example, location component 30 may receive a list of acceptable licensing locations from the license issuer. The location component 30 may also receive the current location 108 of wireless device 102 and determine whether the location 108 is within the list of acceptable licensing locations.

In addition, license generator component 26 may include a duration component 32 operable for determining the duration, e.g., time period, number of uses, etc., in which the license is available. For example, the duration component 32 may receive from the license issuer an expiration date for when the given licensable item 22 is no longer available via the licenses. The duration component 32 may also receive an access time from wireless device 102 trying to access the licensable item 22 and determine whether the access time is within the duration period for the license. License generator component 26 may also include a threshold determiner 33 operable for determining whether a threshold, e.g., a critical mass of users in a location and/or a time period for which access is allowed, is a condition for the license to become available. For example, the license generator component 26 may calculate a total number of users of wireless devices 102 trying to access the given licensable item 22 within a specific location and determine whether the total number of users meets a threshold number of users required for the license to the licensable item 22 to become available.

Thus, the license generator component 26 may receive input from the location component 30, the duration component 32, and the threshold determiner 33 with the respective parameters 28 to associate with license 24 and generate license 24 for the given licensable item 22. License generator component 26 may provide the generated license 24 and respective parameters 28 to licensable item distribution component 20 to associate with licensable item 22.

Server 106 may further include a notification component 34 operable to send one or more notifications 36. For example, notification 36 may alert a user that a virtual copy of licensable item 22 may be available in the location of the user. Notifications 36 may include, but are not limited to, an SMS (short message service) message, a MMS (multimedia messaging service) message, an e-mail message, an audio alert, or any other form of in-application messaging, among other notifications. In an aspect, notifications 36 may include licensable item information, such as but not limited to, a listing of the available licensable items, a name for the licensable item, screen shots of the licensable items, pricing information for the licensable items, reviews of the licensable items, a location for the licensable item, or directions to the licensable items, among other licensable item information.

Figure 2:
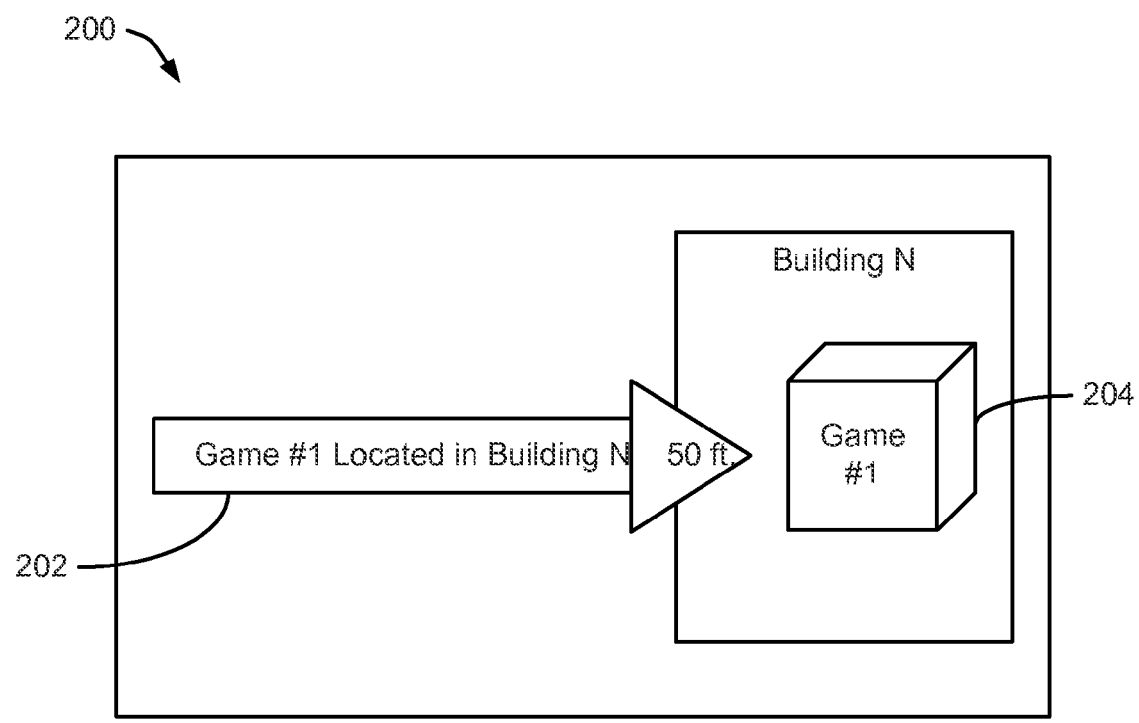
FIG. 2 is an illustration of an example augmented reality interface in accordance with an aspect.

Licensable item distribution component 20 may communicate with wireless device 102 to distribute licensable items 22 to wireless device 102. In addition, licensable item distribution component 20 may provide wireless device 102 information regarding the available licensable items 22 in a particular geographic area, such as a list of the available licensable items 22. Wireless device 102 may include a licensable item searching component 12 operable for searching for available licensable items 22 within the location of the wireless device 102. For example, the licensable item searching component 12 may interface with the licensable item distribution component 20 to determine the available licensable items 22. The location of wireless device 102 may be determined by location component 10. Location component 10 may be, for example, a Global Positioning System (GPS) module that generates latitude and longitude coordinates indicating the location of wireless device 102. Thus, if licensable item 22 is associated with a license 24 that allows the licensable item to be used in the current location of the wireless device, then licensable item searching component 12 may notify the wireless device 102 of the available licensable items 22. For example, a list with the available licensable items 22 may be provided to wireless device 102. Wireless device 102 may further include an augmented reality component 18 operable to present instructions and/or directions to a location of licensable item 22. For example, wireless device 102 may have an image recognition component, such as a camera, that detects an image of the area surrounding the location of the wireless device. Augmented reality component 18 may receive directions to licensable item 22 from licensable item distribution component 20 and overlay the received directions to the location of licensable item 22 over the detected image, as illustrated in FIG. 2, for example. In an aspect, augmented reality component 18 may, for example, overlay an arrow 202 (FIG. 2) pointing in the direction of the licensable item marker 204 (FIG. 2), along with text indicating the distance to travel to the licensable item. Augmented reality component 18 may be updated in near real-time based upon the movements of the user. Thus, as the user moves towards and/or away from licensable item 22, the augmented reality component 18 may be updated to indicate new instructions and/or directions to the location of licensable item 22. In addition, the augmented reality component 18 may overlay licensable item information at the location of licensable item 22. Therefore, when the user reaches the licensable item marker 204 (FIG. 2), the augmented reality component 18 may overlay licensable item information, such as a screen shot of the licensable item, user ratings for the licensable item, the price of the licensable item, and/or an option to download the licensable item, over the detected image.

Wireless device 102 may also include a licensable item requesting component 14 operable to request the available licensable item 22 from licensable item distribution component 20. For example, wireless device 102 may request and subsequently download the available licensable item 22. In an aspect, wireless device 102 may move to location 108 and use licensable item searching component 12 to search for available licensable items 22 at location 108. Alternatively, and/or in addition, wireless device 102 may receive a notification with a list of available licensable items 22 at location 108 from notification component 34. Wireless device 102 may communicate with server 106 and request access to one or more of the available licensable items 22 in location 108. Server 106 may determine whether a license 24 is associated with the one and more requested licensable items 22.

In addition, wireless device 102 may further include a sharing component 16 operable to share the licensable item 22 with other users. For example, if the license 24 associated with licensable item 22 allows the redistribution of licensable item 22, the sharing component 16 may leave a virtual copy of the licensable item 22 along with license 24 in another location. It should be appreciated that the licensable item 22 may be left at another location in several different ways. For example, the sharing component 16 may convey to a licensing server, e.g., server 106, the present location of wireless device 102. The licensing server may add the location of wireless device 102 to a white list of acceptable licensing locations for the given licensable item 22. In addition, the licensing server may assign position location coordinates to the virtual copy of licensable item 22 along with license parameters, such as the area around the position location coordinates where the licensable item 22 may be used, expiration date (e.g., time period, in which the license is available), and number of copies available. For example, if licensable item 22 is associated with a license 24 with redistribution rights (e.g., if the license can be redistributed), wireless device 102 may enter a new location 110 and leave a virtual copy of licensable item 22 at location 110 using the redistribution rights of the license 24 associated with licensable item 22. Wireless device 102 may communicate with the licensing server (e.g., server 106) the new location 110 of wireless device 102 and the licensing server may determine whether wireless device 102 may leave a virtual copy of licensable item 22 at location 110. When other users enter the new location 110 where the virtual copy of licensable item 22 is located, the users can be notified that the virtual copy of licensable item 22 may be available in the location of the user.

In another aspect, sharing component 16 may send a virtual copy of the licensable item 22 along with the license 24 to other users, such as but not limited to, for example, others within a social circle for the user. Licensable item sharing component 16 may redistribute copies of licensable item 22 to other users across various locations using, for example, social media networks associated with the user of wireless device 102 and/or contact lists associated with the wireless device 102. For example, licensable item sharing component 16 may send an e-mail message with access to a virtual copy of the licensable item 22 to e-mail addresses of one or more contacts associated with the user of wireless device 102. In another example, licensable item sharing component 16 may post a message with access to a virtual copy of the licensable item 22 on one or more social media networks associated with the user of wireless device 102, and thus, allowing contacts associated with the social media network accounts access to the virtual copy of the licensable item 22. Thus, licensable item 22 may be redistributed quickly to users in various locations helping to promote and/or market licensable items.

It should be appreciated that one or more wireless devices may access licensable item 22, and thus, more than one virtual copy of licensable item 22 may be distributed from licensable item distribution component 20.

Figure 3:
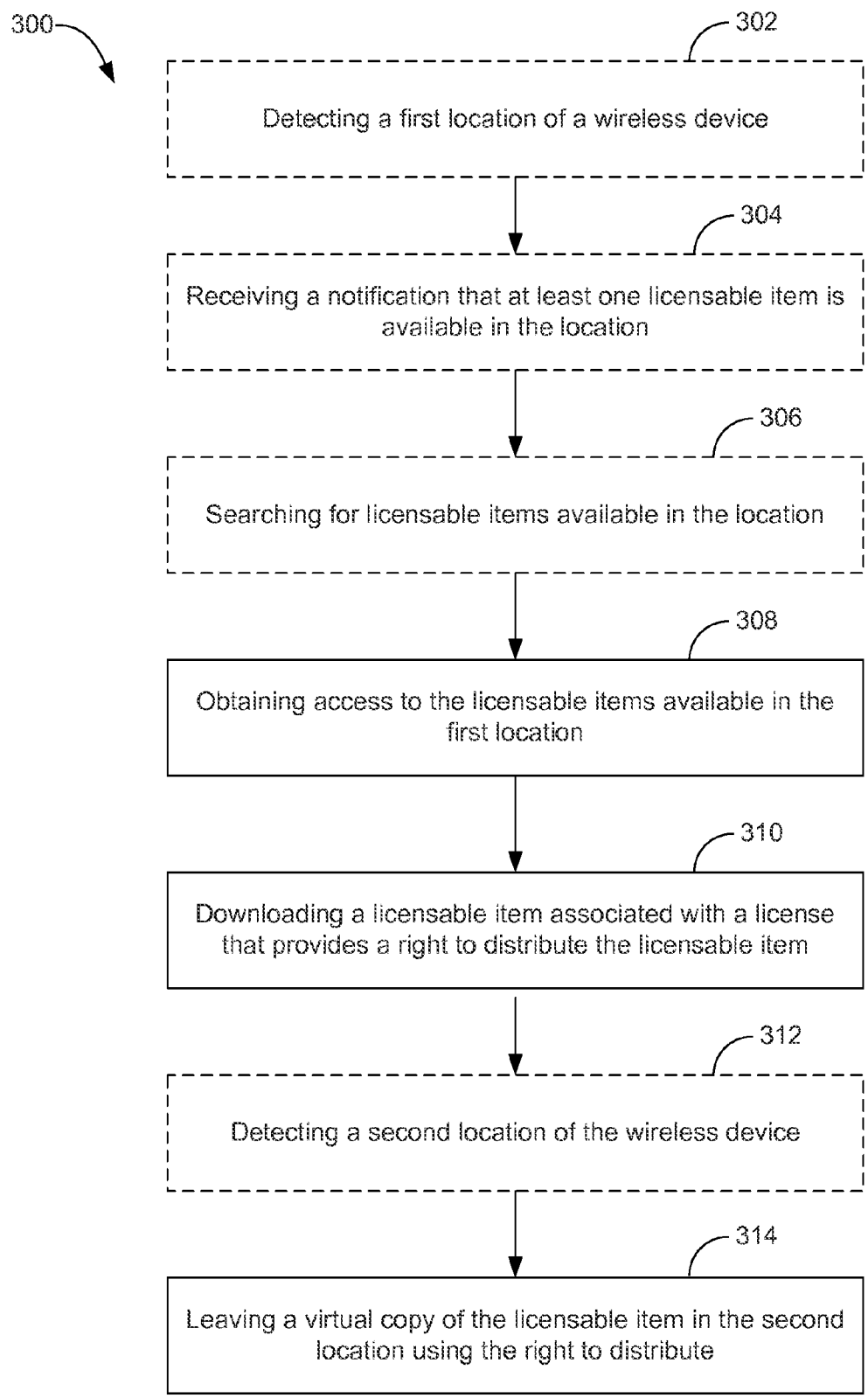
FIG. 3 is an illustration of a flow chart illustrating a method for accessing licensable items in accordance with an aspect.

Referring to FIG. 3, a method 300 for accessing licensable items in accordance with an aspect includes, at 302, detecting a first location of a wireless device. For example, a Global Positioning System (GPS) module on the wireless device 102, e.g., location component 10 (FIG. 1), may generate latitude and longitude coordinates indicating the location of wireless device 102.

At 304, the method may optionally include receiving a notification that licensable items are available in the location of the wireless device. For example, in an aspect, the notification may be in response to the wireless device transmitting a request, including the wireless device location, to a server and requesting a listing of available licensable items in the location. Licensable items may include, but are not limited to, services and/or content, such as an application (e.g., weather applications, sports applications, news applications, shopping applications, or entertainment applications), games, music, or books, among other licensable items. The notification may be, for example, an SMS (short message service) message, an MMS (multimedia messaging service) message, an e-mail message, an audio alert, or any other form of in-application messaging, among other notifications. In addition, the notification may include licensable item information, such as a listing of the available licensable items, the name of the licensable item, screen shots of the licensable item, pricing information for the licensable item, reviews of the licensable item, the location of the licensable item, or directions to the licensable item, among other licensable item information. In some aspects, for example, server 106 may be configured to send push alerts (e.g., a notification), when wireless device 102 enters into a location (e.g., the wireless device 102 crosses a geofence or other geographic threshold) where licensable items may be available for downloading. Therefore, wireless device 102 may receive a notification from server 106 indicating that licensable item is available in the location of the wireless device.

At 306, the method may optionally include searching for licensable items available in the location of the wireless device. For example, wireless device 102 may browse a listing for licensable items available at or near the location of the wireless device. The listing of licensable items may include directions and/or instructions to the location of the licensable items. A user may navigate to the available licensable items by following the directions to the licensable items. The user may receive licensable item information upon reaching the location of the licensable item and use the licensable item information to determine whether to obtain access to the licensable item, e.g., download the licensable item or use the licensable item.

In an aspect, an augmented reality system may be used to present the instructions and/or directions to the location of the licensable item. Wireless device 102 may have an image recognition component, such as a camera, that detects an image of the area surrounding the location of the wireless device. The augmented reality system may overlay the directions to the location of the licensable item over the detected image. For example, the augmented reality system may overlay an arrow pointing in the direction of the licensable item, along with text indicating the distance to travel to the licensable item. The augmented reality system may be updated in near real-time based upon movements of the user. Thus, as the user moves towards and/or away from the licensable item, the augmented reality system may be updated to indicate new instructions and/or directions to the location of the licensable item. In addition, the augmented reality system may overlay licensable item information at the location of the licensable item. Therefore, when the user reaches the licensable item marker, the augmented reality system may overlay licensable item information, such as a screen shot of the licensable item, user ratings for the licensable item, the price of the licensable item, and/or an option to download the licensable item, over the detected image.

Next, at 308, the method may include obtaining access to the licensable item available in the first location of the wireless device. Access to the licensable item may be based upon a license associated with the licensable item in a particular location and/or during a time period. The virtual copy of the licensable item may include the license associated with the licensable item. It should also be noted that the license may be remote from the virtual copy of the licensable item. The license issuer, e.g., the publisher or owner of the licensable item, may set one or more license parameters for the license. License parameters may include, for example, supported locations (e.g., a geographic area where the license may be used); duration of the license (e.g., a time period when the license may be used); quantity threshold (e.g., a number of license to grant before the offer disappears); the license type being offered; behavior when location changes and/or duration expires (e.g., reverting to a demo license, cancel the license, suspend the license, no changes occur); redistribution rights (e.g., if the license can be redistributed, the number of times the license may be redistributed, redistribution location limitations), among other license parameters.

For example, the license associated with the licensable item may be valid as long as the wireless device 102 stays within the particular location. Once the wireless device 102 moves outside of the location, the license may no longer be valid and the licensable item may revert back to a demo license or a revoked license state. In addition and/or alternatively, the license may also be valid as long as the wireless device 102 is using the licensable item during the time period for the license. Once the time period expires, the license may no longer be valid and the licensable item may revert back to the demo license.

In an aspect, obtaining access to the licensable item may be based upon a critical mass requirement, e.g., a certain threshold that must be reached prior to obtaining access to the licensable item. The critical mass requirement may apply, for example, to a number of users, such that the licensable item is only available if a certain number of users have entered into a given geographic area, such as a geo location, associated with the licensable item. For example, the license may be available for the first x number of users to be within the geo location or the first x number of users within the geo location to acquire the licensable item, where "x" is a positive integer. In an alternative or in addition, the critical mass requirement may also apply, for example, to a time element, e.g., the duration of the license, which may also be combined with the number of users. For example, license may provide a condition that the first x number of users to access the licensable item within thirty minutes will have access to the licensable item. The critical mass requirement may also vary depending on the characteristics of the users. User characteristics may include, for example, the age of the users, device capabilities of users, users with certain applications on their device, certain phone numbers, past behaviors of users, such as opting-in for promotions, paying for services, among other user characteristics.

At 310, the method may additionally include downloading the licensable item associated with a license that provides a right to distribute the licensable item. For example, if the license parameters allow the right to distribute, the user of wireless device 102 may download the licensable item and redistribute the licensable item in accordance with the license parameters.

At 312, the method may also include detecting a second location of the wireless device, and at 314, the method may further include leaving a virtual copy of the licensable item in the second location using the right to distribute. For example, wireless device 102 may leave, e.g., drop, copies of the licensable item at various locations for other users of wireless devices to discover. In an aspect, the right to distribute may also allow users of wireless device 102 to redistribute the licensable item to a defined set of other users, such as but not limited to users in their social circle, regardless of the location of the other users. Thus, when a new user discovers a virtual copy of the licensable item in the second location, the license associated with the licensable item may allow the new user to take a virtual copy of the licensable item and redistribute the virtual copy of the licensable item in a different location. Therefore, the licensable item may be redistributed quickly to users in various locations helping to promote and market the licensable item.

Figure 4:
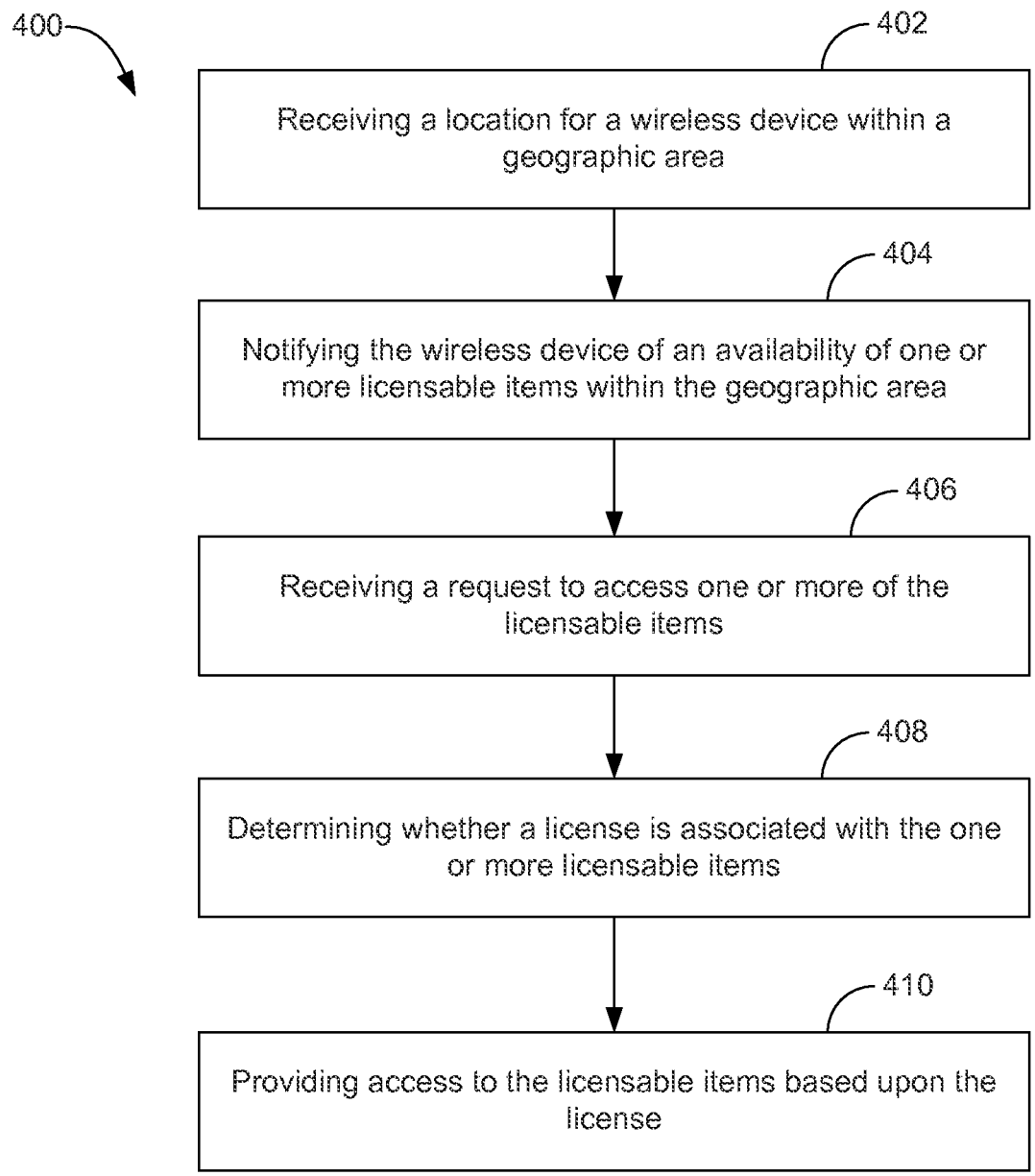
FIG. 4 is an illustration of a flow chart illustrating a method for distributing licensable items within a geographic area in accordance with yet another aspect.

Referring now to FIG. 4, a method 400 for providing access to licensable items within a geographic area in accordance with an aspect includes, at 402, receiving a location update for a wireless device within a geographic area. For example, the server may receive a current location from a location component on the wireless device, such as a global positioning system.

At 404, the method may include notifying the wireless device of an availability of one or more licensable items within the geographic area. The notification may include licensable item information, such as a listing of the available licensable items, the licensable item name, screen shots of the licensable item, pricing information for the licensable item, reviews of the licensable item, the location of the licensable item, or directions to the licensable item, among other licensable item information. In some aspects, for example, server 106 may be configured to send push alerts (e.g., a notification), when wireless device 102 enters into a location (e.g., the wireless device 102 crosses a geofence or other geographic threshold) where licensable items may be available for downloading.

The notifications with the availability of licensable items may be updated in near real-time based upon movements of the wireless device. Thus, as the user moves towards and/or away from various geographic areas, the server may update the notifications to indicate new licensable items in the current location of the wireless device.

Next, at 406, the method may include receiving a request to access one or more of the available licensable items. The server may receive from the wireless device a selection with one or more licensable items.

The method may optionally include, at 408, determining whether a license is associated with the one or more licensable items. For example, a server may receive one or more license parameters, rules, and/or requirements that govern the manner in which the licensable item may be used and/or redistributed.

At 410, the method may include providing access to the licensable item based upon the license. In an aspect, the server may determine whether the license parameters require that the licensable item be used, for example, within a geographic area, a time duration, and/or after an occurrence of a critical mass occurs. Thus, the server may provide access to the licensable items if the information for the wireless device (e.g., location, access time) is within the respective license parameter associated with the licensable item.

In an aspect, the license issuer (e.g., the owner and/or publisher of the licensable item) may reconfigure and manage the license and/or the right of distribution after the licensable item has been accessed by wireless device 102. In one aspect, the license issuer may reconfigure the geographic area (e.g., the geofence) where the license may be used and/or redistributed. The geofence may be dynamically configured after the license is issued to allow for different geographic license guidelines. For example, the license issuer may add and/or remove geographic locations were the licensable item may be used and/or distributed. In addition, the publisher may reconfigure the geofence boundary to include an additional area and/or exclude an area. In another aspect, the license issuer may reconfigure the time period when the licensable item may be used. For example, the license issuer may extend the trial period for using the licensable item for an additional 30 minutes after the original time period expired for using the licensable item.

In one aspect, the license issuer may receive alerts when the user is approaching a geographic boundary which limits the use of the licensable item. For example, the wireless device may send location updates, e.g. determined device location information or signaling information from which the device location may be determined, to the server to alert the server of the device location. In another example, the server may track the location of the device using network-based information, such as associating a location with a device based on a location of one or more base stations or cells with which the device is communicating. In addition, the license issuer may receive an alert that the time period for using the licensable item is about to expire. The license issuer may also receive an alert that the user is approaching the limit of redistributing the licensable item to other users. Thus, the license issuer may decide to change the parameters of how the licensable item may be used and/or redistributed, such as adding the number of users to which the licensable item may be redistributed. For example, if the license issuer is notified that the time period of the promotion is about to end and determines that users are still trying to access the promotional licensable item, the license issuer may extend the duration in which the license is valid to allow more users the opportunity to have access to the licensable item.

Figure 5:
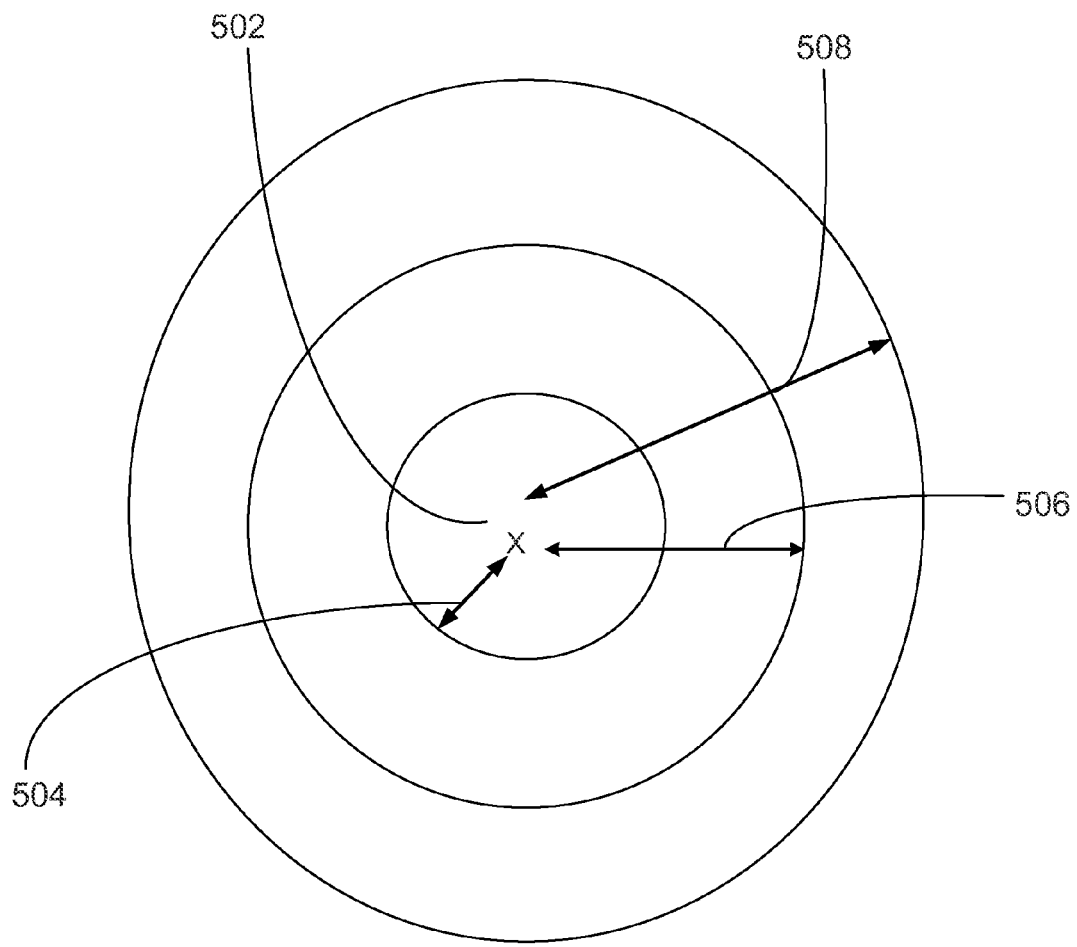
FIG. 5 is a diagram illustrating an example of various levels for accessing licensable items in accordance with another aspect.

In an aspect, various levels of access may be granted to users based on the proximity of users to a location. FIG. 5 is a diagram with various levels of access to licensable item based upon the distance from a geo coordinate 502 in accordance with an aspect. A geo coordinate 502 may be selected for providing a license to use and/or try licensable item while within the geo coordinate 502. Geo coordinate 502 may be, but is not limited to, a geographic location or range of locations, such as may be associated with a landmark, a stadium, a center point, a restaurant, a coffee shop, a store, an airport, a WiFi hotspot, or a cell tower, among other locations.

As users move closer and/or further away from the geo coordinate 502, the levels of access to the licensable item may increase and/or decrease based upon the direction of movement. When a user enters into a location in the vicinity of the geo coordinate 502, the user may be notified that a license for licensable item may be available ahead. For example, when a user enters into a third area 508 surrounding a geo coordinate 502 (e.g., the user crosses a threshold, such as a geo fence boundary), the user may receive a promotion for the licensable item, such as a notification indicating that licensable item may be available ahead. As the user moves closer to the geo coordinate 502, the license may provide more access to the licensable item. For example, in a second area 506 surrounding the licensable item, a license may grant the user a demo version of the licensable item, and in the first area 504 surrounding the geo coordinate 502, the license may grant unlimited access to the licensable item while the user remains within the first area 504. Thus, the levels of access to the licensable item provided by the license may increase and/or decrease based upon a proximity of a user to a geo coordinate 502.

For example, when a user attends a football game and the user is within a mile of the stadium, the user may receive notification with a promotion for a game to play. As the user moves closer to the stadium, e.g., within a hundred yards of the stadium, the user may receive a free demo version of the game. When the user moves within the stadium, the user may receive unlimited access to the game while the user stays within the stadium and/or an area surrounding the stadium. The levels of access to the game may decrease as the user leaves the stadium. Thus, the license may revert back to the demo version and/or the original level of access to the licensable item (e.g., the user must purchase the licensable item in order to use it) as the user moves away from the geo coordinate 502.

Alternatively, or in addition, it should also be appreciated that a license may allow various levels of access to the licensable item based upon a time period for using the licensable item for a promotion, e.g., a user may play a game for free for thirty minutes before having to pay to play the game. For example, as the time period for using the licensable item expires, the license may revert back to a demo mode and/or the original terms of the license as the time period expires. It should also be appreciated that the various levels of access to the licensable item may include both a distance element, e.g., how close and/or far away a user is from a geo coordinate, and a time element, e.g., how long the user may use the licensable item for the promotion.

In an aspect, a notification may be sent as the user approaches a geographic area. For example, when the user approaches the threshold to the second area 506 a notification may be sent notifying the user that the second area 506 is approaching. The notification may include, for example, an alarm, a sound, an icon on the display of the wireless device, a notification message, an alert, or any other form of in-application messaging, among other notifications. If the user is moving from the first area 504 to the second area 506, the notification may notify the user that the level of access to the licensable item may decrease if the user continues into the second area 506. Alternatively, if the user is moving from the second area 506 to the first area 504, the notification may notify the user that the level of access to the licensable item may increase if the user continues into the first area 504.

The notification may also include information regarding the number of users that are needed to achieve a critical mass requirement, e.g. a threshold of users within a location. For example, the notification may notify the users that twenty more users are needed to win a free application. Alternatively, the notification may notify the users that the free application is available only to the next ten users who access the application. The notifications may be used to encourage more people to try the application and/or encourage other users to participate in the promotion.

Figure 6:
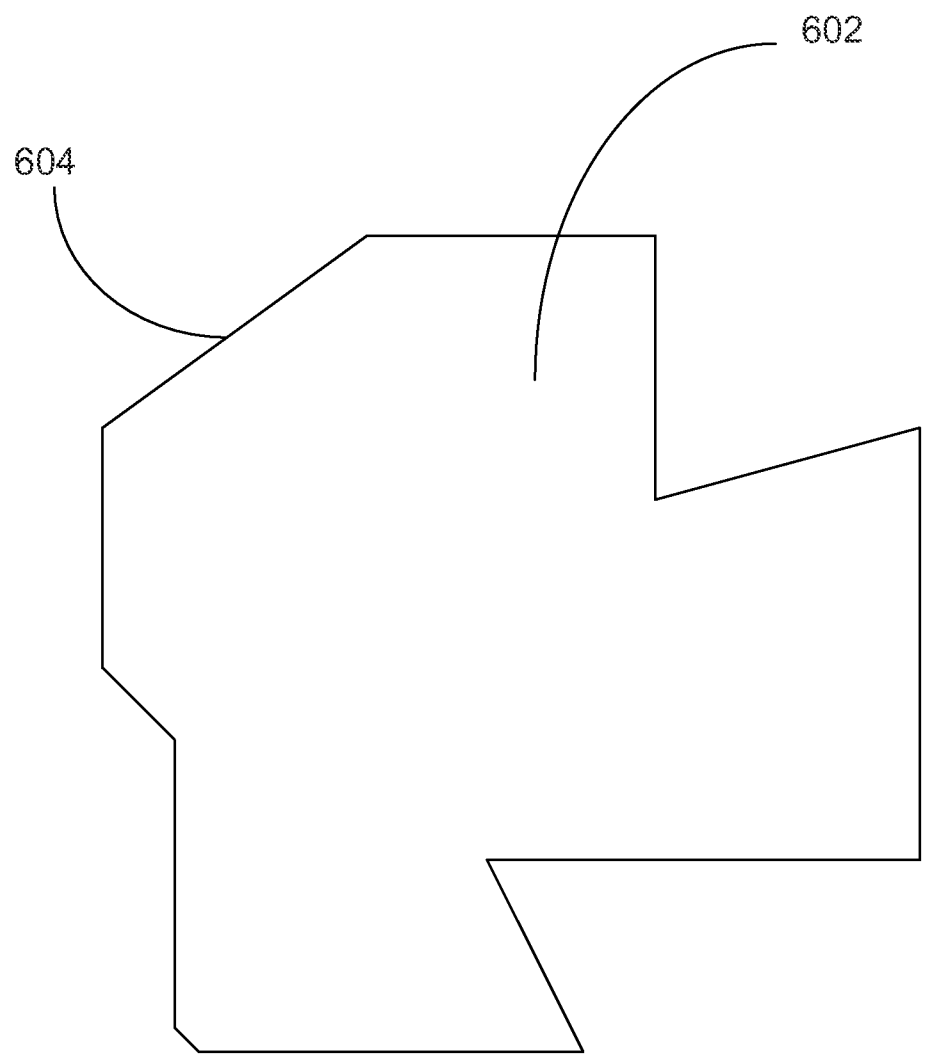
FIG. 6 is a diagram illustrating an example geographic area for accessing licensable items in accordance with still another aspect.

The geo-location where the licensable item may be used may be determined mathematically, e.g., a mile radius from a geo coordinate, or may be determined manually, e.g., an administrator draws the shape of the geo-location. Referring now to FIG. 6, illustrated is an example of a defined geographic area for accessing licensable items. In an aspect, an administrator may create a geographic area 602 where access to licensable items may be permitted. For example, when a user crosses a threshold and/or boundary 604, the user may enter into the geographic area 602 and have access to the licensable items. It should be appreciated that the geographic area 602 may be a dynamically configurable area, e.g., of various shapes which may change. Thus, the geographic area 602 may change from the initial configuration. In an aspect, a notification may be sent to a user when the user enters into the geographic area 602, e.g., crosses over boundary 604. The notification may include a list of the available licensable items in geographic area 602, and/or the licenses available for licensable items in the geographic area 602.

One variation of the described aspects may include providing sponsored connectivity while using the licensable item within the location specified by the license for the licensable item. Sponsored connectivity may include subsidizing the price of data connectivity, such as providing the data connectivity at a reduced rate and/or free of charge. For example, a network provider may provide unlimited use of the network services to users within a bookstore to download books from a publisher while the users remain within the bookstore. Thus, licensable item publishers may pair with network providers to promote access to licensable items of the publisher and/or the network provider services. In addition, the sponsored connectivity may also be based upon a critical mass of users accessing the licensable item. Once a critical mass threshold is achieved, the sponsored connectivity may be limited. For example, a network provider may provide the first twelve users to access the promotional licensable item within a café use of the network services for free while trying the promotional licensable item.

Figure 7:
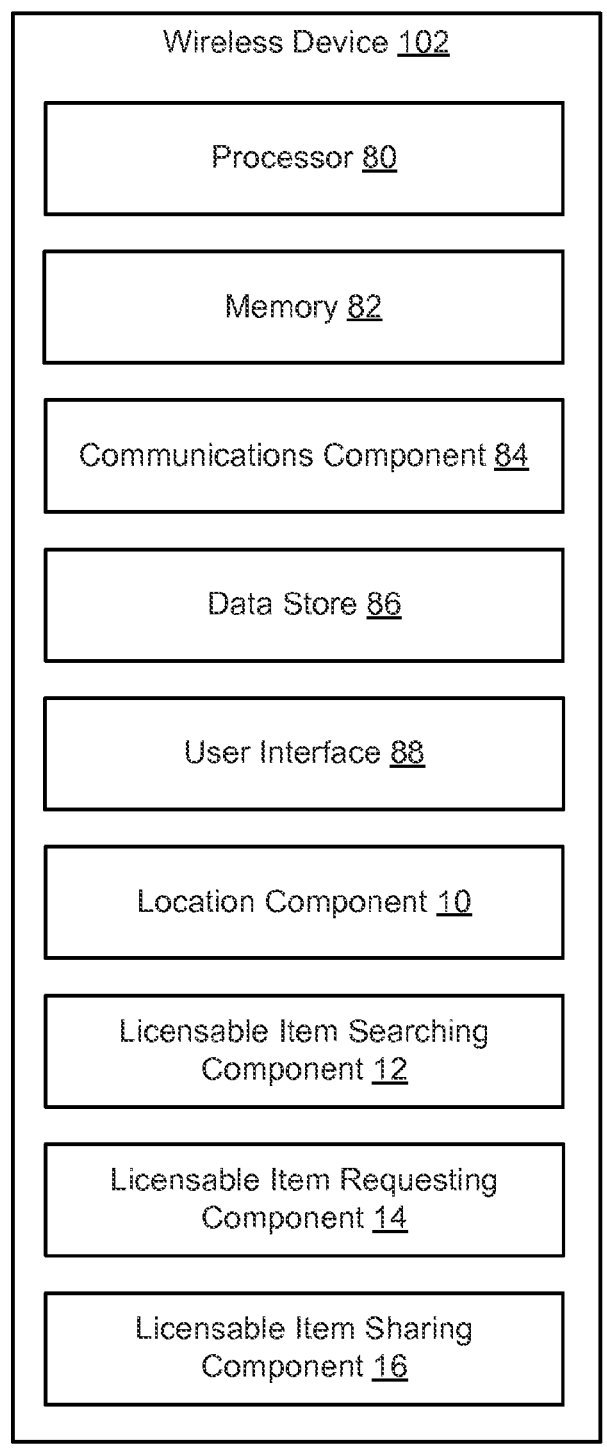
FIG. 7 is an example wireless device operable within the connectivity system in accordance with an aspect.

Referring now to FIG. 7, in one aspect, wireless device 102 may include a processor 80 for carrying out processing functions associated with one or more of components and functions described herein. Processor 80 can include a single or multiple set of processors or multi-core processors. Moreover, processor 80 can be implemented as an integrated processing system and/or a distributed processing system.

Wireless device 102 may further include a memory 82, such as for storing local versions of applications being executed by processor 80. Memory 82 can include a type of memory usable by a computer, such as random access memory (RAM), read only memory (ROM), tapes, magnetic discs, optical discs, volatile memory, non-volatile memory, and any combination thereof.

Further, wireless device 102 may include a communications component 84 that provides for establishing and maintaining communications with one or more parties utilizing hardware, software, and services as described herein. Communications component 84 may carry communications between components on wireless device 102, as well as between wireless device 102 and external devices, such as devices located across a communications network and/or devices serially or locally connected to wireless device 102. For example, communications component 84 may include one or more buses, and may further include transmit chain components and receive chain components associated with a transmitter and receiver, respectively, operable for interfacing with external devices.

Additionally, wireless device 102 may further include a data store 86, which can be any suitable combination of hardware and/or software, that provides for mass storage of information, databases, and programs employed in connection with aspects described herein. For example, data store 86 may be a data repository for applications not currently being executed by processor 80.

Wireless device 102 may additionally include a user interface component 88 operable to receive inputs from a user of wireless device 102, and further operable to generate outputs for presentation to the user. User interface component 88 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 88 may include one or more output devices, including but not limited to a display, a speaker, a haptic feedback mechanism, a printer, any other mechanism capable of presenting an output to a user, or any combination thereof.

Wireless device 102 may also include location component 10 operable for detecting the location of wireless device 102. In addition, wireless device 102 may include a licensable item searching component 12 operable for detecting the available licensable item in the location of wireless device 102. Wireless device 102 may further include a licensable item requesting component 14 operable to request licensable item that is available in the location of wireless device 102. Moreover, wireless device 102 may also include a licensable item sharing component 16 operable to share the licensable item with other users. In an aspect, interface component 88 may transmit and/or receive messages corresponding to the operation of location component 10, licensable item searching component 12, licensable item requesting component 14, and licensable item sharing component 16. In addition, processor 80 may execute location component 10, licensable item searching component 12, licensable item requesting component 14, and licensable item sharing component 16 and memory 82 may store them.

Figure 8:
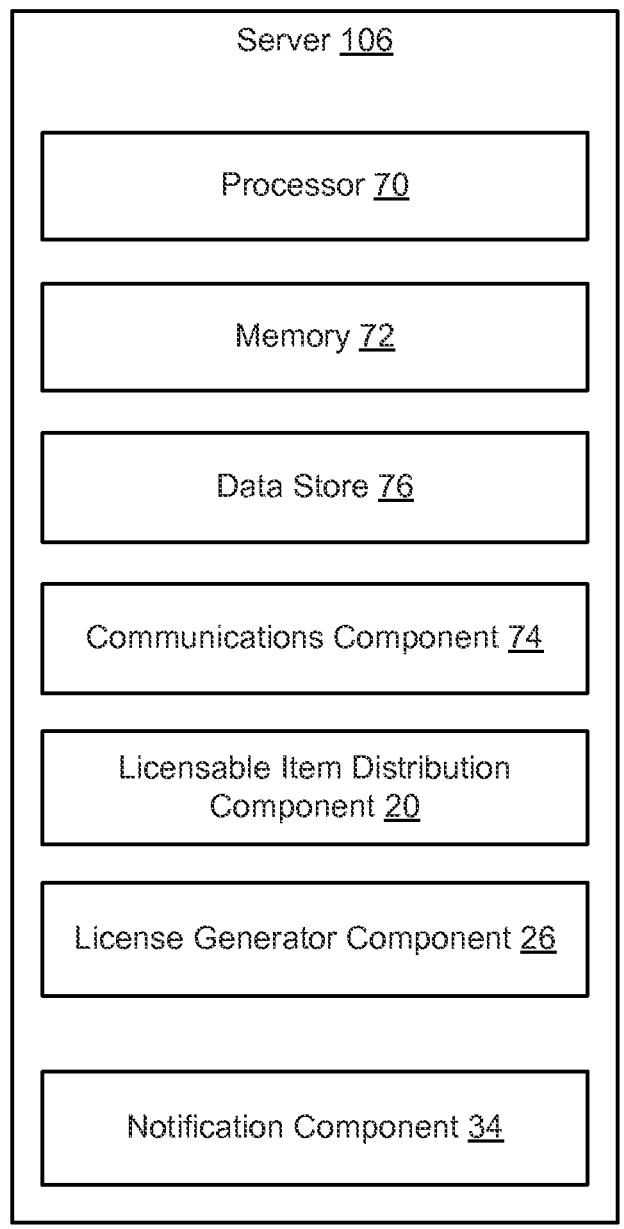
FIG. 8 is an example sever device operable within the connectivity system in accordance with yet another aspect.

Referring now to FIG. 8, illustrated is an example server 106 in accordance with one aspect. Server 106 manages network connectivity matters for access network 104. Server 106 includes processor component 70 for carrying out processing functions associated with one or more of components and functions described herein. Processor component 70 can include a single or multiple set of processors or multi-core processors. Moreover, processing component 70 can be implemented as an integrated processing system and/or a distributed processing system.

Server 106 further includes a memory 72, such as for storing local versions of applications being executed by processor component 70. Memory 72 can include random access memory (RAM), read only memory (ROM), and a combination thereof.

Further, server 106 includes a communications component 74 that provides for establishing and maintaining communications with one or more parties utilizing hardware, software, and services as described herein. Communications component 74 may carry communications between components on server 106, as well as between server 106 and external devices, such as devices located across a communications network and/or devices serially or locally connected to server 106.

Additionally, server 106 may further include a data store 76, which can be any suitable combination of hardware and/or software, that provides for mass storage of information, databases, and programs employed in connection with aspects described herein. For example, data store 76 may be a data repository for applications not currently executing.

Server 106 may also include a licensable item distribution component 20 operable to distribute licensable items to one or more wireless devices. In addition, server 106 may include a license generator component 26 operable to generate a license that governs the use and/or distribution of the licensable items distributed by licensable item distribution component 20. Server 106 may also include a notification component 34 operable to generate one or more notifications to one or more wireless devices. In an aspect, communications component 74 may transmit and/or receive messages corresponding to the operation of licensable item distribution component 20, license generator component 26, and notification component 34. In addition, processor 70 may execute licensable item distribution component 20, license generator component 26, and notification component 34, and memory 72 may store them.

Figure 9:
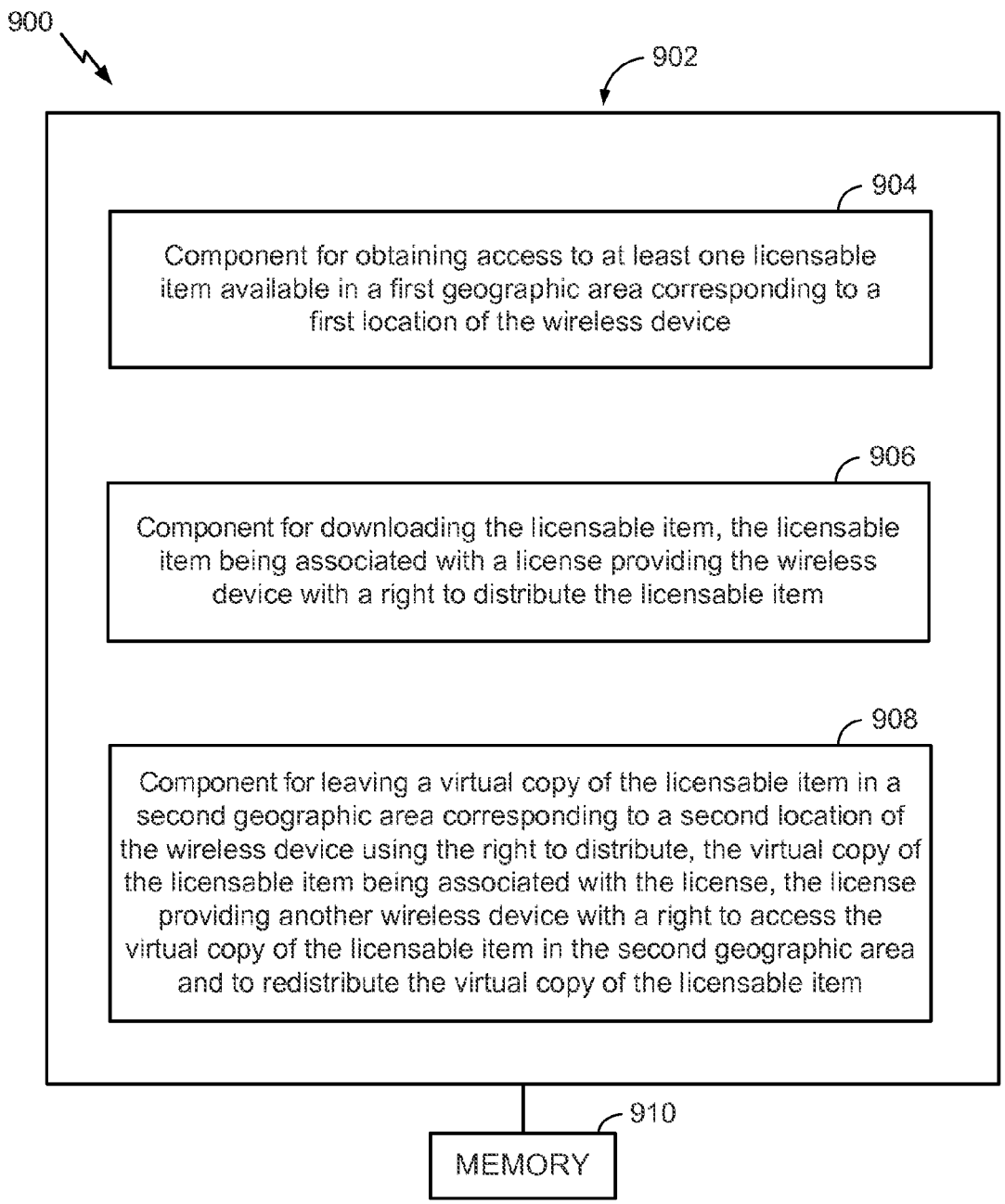
FIG. 9 is an illustration of an example system that facilitates accessing licensable items in accordance with still another aspect.

Referring now to FIG. 9, illustrated is a system 900 configured to access licensable items unique to a geographic area via a wireless device. For example, system 900 can reside at least partially within a transmitter, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that facilitate accessing licensable items. For instance, logical grouping 902 may include component 904 for obtaining access to at least one licensable item available in a first geographic area corresponding to a first location of the wireless device. In one aspect, obtaining access to the licensable item may be based upon a critical mass requirement, e.g., a certain threshold that must be reached prior to obtaining access to the licensable item, as described above. In addition, logical grouping 902 may include component 906 for downloading the licensable item, the licensable item being associated with a license providing the wireless device with a right to distribute the licensable item. Logical grouping 902 may additionally include component 908 for leaving a virtual copy of the licensable item in a second geographic area corresponding to a second location of the wireless device using the right to distribute. In such aspect, the virtual copy of the licensable item being associated with the license, the license further provides another wireless device with a right to access the virtual copy of the licensable item in the second geographic area and to redistribute the virtual copy of the licensable item. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

Figure 10:
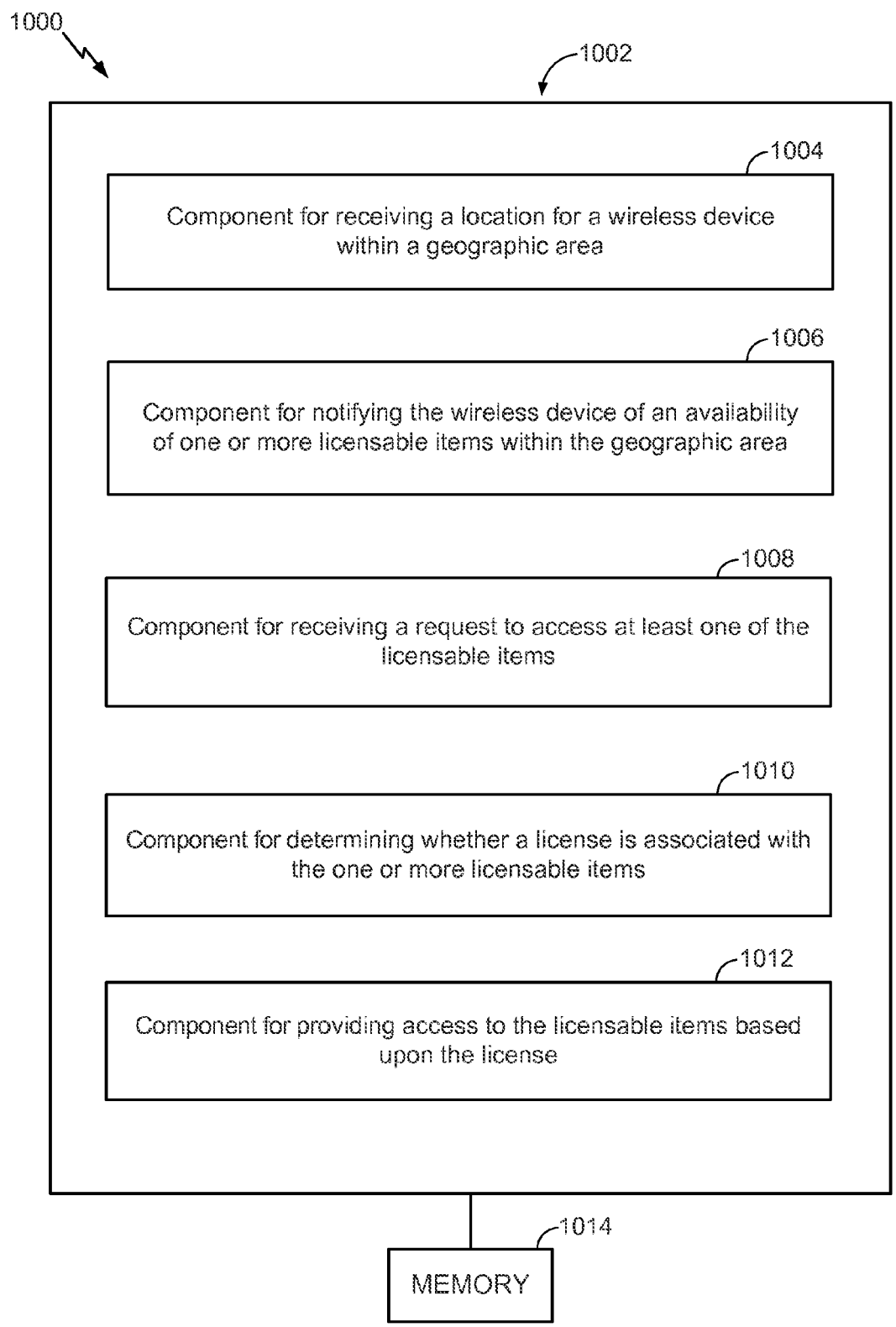
FIG. 10 is an illustration of an example system that facilitates distributing licensable items in accordance with another aspect.

Referring now to FIG. 10, illustrated is a system 1000 configured to distribute licensable items within a geographic area. For example, system 1000 can reside at least partially within a transmitter, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that facilitate distributing licensable items. For instance, logical grouping 1002 may include component 1004 for receiving a location for a wireless device within a geographic area. Further, logical grouping 1002 may comprise component 1006 for notifying the wireless device of an availability of one or more licensable items within the geographic area. In addition, logical grouping 1002 may include component 1008 for receiving a request to access at least one of the one or more licensable items. Logical grouping 1002 may also include component 1010 for determining whether a license is associated with the one or more licensable items. Logical grouping 1002 may additionally include component 1012 for providing access to the licensable items based upon the license. Additionally, system 1000 can include a memory 1014 that retains instructions for executing functions associated with electrical components 1004, 1006, 1008, 1010, and 1012. While shown as being external to memory 1014, it is to be understood that one or more of electrical components 1004, 1006, 1008, 1010, and 1012 can exist within memory 1014.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95, and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or implementations, it should be noted that various changes and modifications could be made herein without departing from the scope of the described aspects and/or implementations as defined by the appended claims. Furthermore, although elements of the described aspects and/or implementations may be described or claimed in the singular, the plural is contemplated unless limitation to the singular is explicitly stated. Additionally, all or a portion of any aspect and/or implementation may be utilized with all or a portion of any other aspect and/or implementation, unless stated otherwise.

What is claimed is:

1. A method for distributing licensable items, comprising:
   receiving a location for a wireless device within a first geographic area;
   sending a notification to the wireless device indicating an availability of one or more licensable items within the first geographic area;
   receiving a request to access at least one of the one or more licensable items;
   providing the wireless device with access to the at least one licensable item from within the first geographic area based upon a license that further provides the wireless device with a right to redistribute the at least one licensable item in a second geographic area; and
   reconfiguring the license after the wireless device is provided with access to the at least one licensable item, wherein the license is reconfigured to provide another wireless device with a right to access a virtual copy of the at least one licensable item from within the second geographic area.

2. The method of claim 1, wherein providing access to the at least one licensable item further comprises assigning the first geographic area to the at least one licensable item.

3. The method of claim 1, wherein providing access to the at least one licensable item further comprises:
   determining whether obtaining a critical mass requirement is required before providing access to the at least one licensable item;
   notifying the wireless device of the critical mass requirement; and
   providing access to the at least one licensable item upon an occurrence of the critical mass requirement.

4. The method of claim 3, wherein the critical mass requirement comprises one of a minimum number of wireless devices in the second geographic area trying to access the at least one licensable item, a maximum number of wireless devices in the second geographic area capable of accessing the at least one licensable item, a configurable time period for accessing the at least one licensable item, or any combination thereof.

5. The method of claim 3, wherein the critical mass requirement varies based upon characteristics of a user associated with the wireless device.

6. The method of claim 3, wherein a value of the critical mass requirement is a function of a user characteristic associated with another wireless device attempting to access a virtual copy of the at least one licensable item from within the second geographic area.

7. The method of claim 1, further comprising:
   notifying the wireless device that the first geographic area for accessing the at least one licensable item is approaching.

8. The method of claim 1, further comprising:
   sending the notification to the wireless device when the wireless device crosses a geofence defining the first geographic area within which the one or more licensable items are available.

9. The method of claim 8, wherein the wireless device crosses the geofence when one of entering into the first geographic area or leaving the first geographic area.

10. The method of claim 1, wherein the notification comprises one of a short message service (SMS) notification, a multimedia messaging service (MMS) notification, an electronic mail notification, or an in-application message.

11. The method of claim 1, further comprising sending the notification with instructions or directions to the first geographic area.

12. The method of claim 1, wherein the reconfigured license provides the another wireless device with a right to redistribute the virtual copy of the at least one licensable item.

13. At least one processor configured to distribute licensable items, comprising:
   a first module for receiving a location for a wireless device within a first geographic area;
   a second module for sending a notification to the wireless device indicating an availability of one or more licensable items within the first geographic area;
   a third module for receiving a request to access at least one of the one or more licensable items;
   a fourth module for providing the wireless device with access to the at least one licensable item from within the first geographic area based upon a license that further provides the wireless device with a right to redistribute the at least one licensable item in a second geographic area; and
   a fifth module for reconfiguring the license after the wireless device is provided with access to the at least one licensable item, wherein the license is reconfigured to provide another wireless device with a right to access a virtual copy of the at least one licensable item from within the second geographic area.

14. A non-transitory computer-readable medium, comprising one or more instructions for causing a computer to:
   receive a location for a wireless device within a first geographic area;
   send a notification to the wireless device indicating an availability of one or more licensable items within the first geographic area;
   receive a request to access at least one of the one or more licensable items;

provide the wireless device with access to the at least one licensable item from within the first geographic area based upon a license that further provides the wireless device with a right to redistribute the at least one licensable item in a second geographic area; and reconfigure the license after the wireless device is provided with access to the at least one licensable item, wherein the license is reconfigured to provide another wireless device with a right to access a virtual copy of the at least one licensable item from within the second geographic area.

15. An apparatus, comprising:
means for receiving a location for a wireless device within a first geographic area;
means for sending a notification to the wireless device indicating an availability of one or more licensable items within the first geographic area;
means for receiving a request to access at least one of the one or more licensable items;
means for providing the wireless device with access to the at least one licensable item from within the first geographic area based upon a license that further provides the wireless device with a right to redistribute the at least one licensable item in a second geographic area; and
means for reconfiguring the license after the wireless device is provided with access to the at least one licensable item, wherein the license is reconfigured to provide another wireless device with a right to access a virtual copy of the at least one licensable item from within the second geographic area.

16. An apparatus for distributing licensable items, comprising:
a receiver configured to receive a location for a wireless device within a first geographic area;
a transmitter configured to send a notification to the wireless device indicating an availability of one or more licensable items within the first geographic area, the receiver further configured to receive a request to access at least one of the one or more licensable items; and
one or more processors configured to provide the wireless device with access to the at least one licensable item from within the first geographic area based upon a license that further provides the wireless device with a right to redistribute the at least one licensable item in a second geographic area, the one or more processors further configured to reconfigure the license after the wireless device is provided with access to the at least one licensable item, wherein the license is reconfigured to provide another wireless device with a right to access a virtual copy of the at least one licensable item from within the second geographic area.

17. The apparatus of claim 16, wherein the one or more processors are further configured to assign the first geographic area to the licensable items.

18. The apparatus of claim 16, wherein the one or more processors are further configured to:
determine whether obtaining a critical mass requirement is required before providing access to the at least one licensable item;
provide access to the at least one licensable item upon an occurrence of the critical mass requirement; and
send, via the transmitter, a notification to the wireless device of the critical mass requirement.

19. The apparatus of claim 18, wherein the critical mass requirement comprises one of a minimum number of wireless devices in the second geographic area trying to access the at least one licensable item, a maximum number of wireless devices in the second geographic area capable of accessing the at least one licensable item, a configurable time period for accessing the at least one licensable item, or any combination thereof.

20. The apparatus of claim 18, wherein the critical mass requirement varies based upon characteristics of a user associated with the wireless device.

21. The apparatus of claim 18, wherein a value of the critical mass requirement is a function of a user characteristic associated with another wireless device attempting to access a virtual copy of the at least one licensable item from within the second geographic area.

22. The apparatus of claim 16, wherein the one or more processors are further configured to cause the transmitter to send the notification when the wireless device is approaching the first geographic area.

23. The apparatus of claim 16, wherein the one or more processors are further configured to cause the transmitter to send the notification when the wireless device crosses a geofence defining the first geographic area within which the one or more licensable items are available.

24. The apparatus of claim 16, wherein the geofence is crossed in response to the wireless device one of entering into the first geographic area or leaving the first geographic area.

25. The apparatus of claim 16, wherein the notification comprises one of a short message service (SMS) notification, a multimedia messaging service (MMS) notification, an electronic mail notification, or an in-application message.

26. The apparatus of claim 16, wherein the one or more processors are further configured to cause the transmitter to send the notification with instructions or directions to the first geographic area.

* * * * *